United States Patent [19]

Bracke et al.

[11] 4,393,171
[45] * Jul. 12, 1983

[54] PROCESS FOR PREPARING RUBBERY POLYMER REINFORCED STYRENIC RESINS

[75] Inventors: William J. I. Bracke, Hamme; Emmanuel Lanza, Waterloo, both of Belgium

[73] Assignee: Labofina, S.A., Brussels, Belgium

[ * ] Notice: The portion of the term of this patent subsequent to Sep. 1, 1998, has been disclaimed.

[21] Appl. No.: 238,414

[22] Filed: Feb. 26, 1981

[51] Int. Cl.³ ............................................. C08F 257/02
[52] U.S. Cl. ..................................... 525/309; 525/53; 525/263; 525/292; 525/305
[58] Field of Search ............... 525/309, 263, 292, 305, 525/307

[56] References Cited

U.S. PATENT DOCUMENTS

| | | | |
|---|---|---|---|
| 2,994,683 | 8/1961 | Calvert | 525/310 |
| 3,047,533 | 7/1962 | Calvert | 525/83 |
| 3,793,402 | 2/1974 | Owens | 525/81 |
| 3,845,164 | 10/1974 | Goto et al. | 525/81 |
| 3,903,200 | 9/1975 | Cincera et al. | 525/71 |
| 3,971,835 | 7/1976 | Myers et al. | 525/81 |
| 4,277,574 | 7/1901 | Jastrzebsori et al. | 525/86 |
| 4,283,506 | 8/1981 | Bracke et al. | 525/309 |
| 4,287,318 | 9/1981 | Bracke et al. | 525/263 |

OTHER PUBLICATIONS

Article by Manson et al., entitled "Polymer Blends and Composites" pp. 237–270.

Primary Examiner—Stanford M. Levin
Attorney, Agent, or Firm—Schwartz, Jeffery, Schwaab, Mack, Blumenthal & Koch

[57] ABSTRACT

A continuous mass polymerization process for preparing rubber reinforced styrenic copolymers comprising forming a solution in an inert solvent of a styrenic polymer matrix and a monomer material capable of polymerizing to form a cross-linked rubbery polmyer, continuously charging the solution into a polymerization reactor and subjecting the solution to mass polymerization conditions whereby there is formed in situ a cross-linked rubbery polymer dispersed in the styrenic polymer matrix, continuously withdrawing the reaction mixture from the polymerization reactor and recovering the resulting rubber reinforced styrenic copolymer.

43 Claims, No Drawings

PROCESS FOR PREPARING RUBBERY POLYMER REINFORCED STYRENIC RESINS

BACKGROUND OF THE INVENTION

The present invention relates to a new process for preparing rubber reinforced resins, such as ASA resins, which are composites of styrene-acrylonitrile copolymers and cross-linked rubbery acrylate polymers, ABS resins which are composites of styrene-acrylonitrile copolymers and cross-linked rubbery butadiene polymers, ABSA resins which are composites of styrene-acrylonitrile copolymers with polymerized acrylate and butadiene, and high impact polystyrene resins (HIPS) which are composites of styrene homopolymers with rubbery butadiene polymers or rubbery acrylic polymers.

It is well known that styrene homopolymers and copolymers of styrene and acrylonitrile have a poor impact strength. In order to increase this impact strength, rubber is added to these styrene polymers where it acts as a reinforcing agent. One widely used method is to polymerize styrene in the presence of an unsaturated rubber. The products obtained by this method are more stable and have superior properties when compared with products prepared by other methods, such as blending or milling.

One usual technique for preparing rubber-reinforced styrenic resins is to graft chains of homopolymers or copolymers of styrene onto a rubber, either by an all emulsion process or an all suspension process or a mass-suspension process. Such techniques present an economic problem, since the manufacture of these reinforced styrenic resins depends on rubber supplies.

In order to decrease the costs of these reinforced styrenic resins and to obviate some drawbacks of the prior processes, it has been proposed to prepare rubber reinforced styrenic resins by forming the rubber particles in situ in the presence of a rigid styrenic resin. A process for this production of reinforced styrenic resins by suspension polymerization is described in U.S. patent application Ser. No. 024,837 filed on Mar. 28, 1979, U.S. Pat. No. 4,263,420, which is a continuation-in-part of application Ser. No. 916,576 filed on June 19, 1978, abandoned, which in turn is a continuation-in-part of application Ser. No. 890,211 filed on Mar. 27, 1978, abandoned, by the same applicant and assigned to the assignee hereof. The process comprises contacting a polystyrenic matrix and a monomer or a mixture of monomers capable of forming a rubbery polymer by polymerization, and then suspension polymerizing said monomer(s) to form a rubbery polymer partly grafted to the polystyrenic matrix. The production of rubber reinforced styrenic resins by this method is a batch-wise process. Moreover, the beads obtained by this suspension method must be washed, centrifuged and dried.

There exists a need in the art, therefore, for a less expensive method for producing rubber reinforced styrenic resins.

SUMMARY OF THE INVENTION

It is therefore an object of the instant invention to provide a new process for polymerization of monomers in the presence of a styrenic polymer matrix.

It is another object of the present invention to provide an improved process for preparing rubber reinforced styrenic resins, wherein the rubber particles are formed in situ by mass polymerization in the presence of a styrenic polymer matrix.

A further object of this invention is to provide an improved continuous process for mass polymerization of monomers, which form a rubbery polymer by polymerization, in the presence of a styrene-acrylonitrile copolymer matrix.

The objects of the invention are achieved by providing a continuous mass polymerization process for preparing rubber reinforced styrenic copolymer resins comprising the steps of forming a solution in an inert solvent comprising a styrenic resin matrix and a monomer material capable of polymerizing to form a cross-linked rubbery polymer material; continuously charging the solution into a polymerization reactor and subjecting the solution to mass polymerization conditions to polymerize the monomer material whereby there is formed in situ a cross-linked rubbery polymer material dispersed in the styrenic resin matrix; continuously withdrawing the reaction mixture from the polymerization reactor; and recovering a rubber reinforced styrenic copolymer resin from the withdrawn reaction mixture.

In one aspect of the present invention, there is provided a continuous mass process for preparing rubber reinforced styrenic resins of the ASA-type which are composite styrenic compound-acrylonitrile copolymers and cross-linked rubbery acrylate polymers, said process comprising the steps of adding an acrylate monomer material selected from the group consisting of alkyl esters of acrylic acid, alkyl esters of methacrylic acid and mixtures thereof, together with a cross-linking agent to a first solution of a copolymeric matrix of a styrenic compound and acrylonitrile in an inert solvent, whereby there is formed a second solution of monomer material, cross-linking agent and said copolymer in said inert solvent, continuously charging said second solution into a polymerization zone and subjecting said second solution to mass polymerization conditions to polymerize said monomer material whereby there is formed in situ a cross-linked rubbery material dispersed in said copolymeric matrix; continuously withdrawing the reaction mixture from said polymerization zone and continuously charging it into a devolatilization zone to remove the inert solvent and the residual monomer material, and recovering a rubber reinforced ASA-type styrenic resin wherein the acrylate rubber formed in situ is highly dispersed in the copolymer matrix.

DETAILED DESCRIPTION OF PREFERRED EMBODIMENTS

The process of the present invention for preparing rubber reinforced styrenic resins consists essentially in adding a monomer material capable of forming a rubbery polymer such as an acrylic ester, a mixture of acrylic esters, and/or a diolefin to a solution of a styrenic resin such as a homopolymer of styrene or a copolymer of styrene compound and acrylonitrile (or styrenic polymer matrix) in an inert solvent and in carrying out a mass polymerization of said monomer material with formation in situ of a rubbery polymer partly grafted on and dispersed throughout the styrenic polymer matrix.

The styrenic compound which is most often used for preparing the styrenic polymer matrix is styrene, yet styrene derivatives, such as halogen-, alkyl- and aryl-substituted styrenes and vinyl derivatives of naphthalene may be used in admixture with styrene. Specific examples of such styrene derivatives include the methyl styrenes such as alpha-methylstyrene, vinyltoluene, p-chlorostyrene, phenyl styrenes, vinylnaphthalene, etc. As is known in the art, the amount of the styrene derivatives which may be optionally used in admixture with styrene may vary between wide limits. In the following text such materials are collectively referred to as "styrenic compound."

The polymeric matrix may also be a copolymer of a styrenic compound and an ethylenically unsaturated monomer copolymerizable with the styrenic compound. Suitable copolymerizable monomers are acrylic compounds, such as acrylonitrile, methacrylonitrile, alkyl, preferably lower alkyl, esters of acrylic and methacrylic acid, e.g. alkyl methacrylate and mixtures of acrylonitrile or methacrylonitrile with an alkyl acrylate or alkyl methacrylate.

Preferred copolymers of styrenic compounds and acrylic compounds include SAN-type copolymers of styrenic compounds and acrylonitrile and/or methacrylonitrile. In the following text acrylonitrile and methacrylonitrile are collectively referred to as "acrylonitrile."

The amounts of styrenic compounds and acrylic compounds within the polymer matrix may vary within wide limits, depending on the type of acrylic compound which is used, and on the desired properties of the copolymer. Accordingly, the amount of styrenic compound is at least 10%, by weight, based on the copolymer, but may reach 100%, by weight. Generally the weight ratio of styrenic compound to acrylonitrile will range between about 4:1 and about 1:1. The styrenic compound-acrylic compound copolymer is preferably prepared by continuous mass-polymerization of the monomer mixture.

The copolymer of styrenic and acrylic compounds forming the polymeric matrix may also be prepared in the presence of a minor amount of another copolymerizable monomer such as butadiene or of a rubbery polymer such as polybutadiene, this amount generally not exceeding 8%, by weight, based on the weight of the starting monomers. In a preferred embodiment of the invention, the styrenic polymer matrix is substantially free of reactive sites.

Preferably, the styrenic polymer matrix is dissolved in an inert solvent which acts also as a solvent or at least as a dispersing agent for the monomer material. The inert solvent can be any saturated solvent boiling between about 120° C. and about 175° C. at atmospheric pressure and preferably between about 130° C. and about 150° C. Particularly preferred solvents are saturated alkylbenzenes, such as ethylbenzene.

The solution of styrenic copolymer matrix in the inert solvent may contain from about 10 to about 70 weight % of styrenic copolymer. Lower concentrations of copolymeric matrix would require the removal of large amounts of solvent after the production of the styrenic resin. On the other hand, monomers such as the acrylate esters are not easily dissolved or dispersed in a viscous solution having a high content in copolymeric matrix. Preferably, the solution will contain from about 20 to about 50 weight % of copolymeric matrix.

A monomer material which produces a rubbery polymer by polymerization is added to the solution of styrenic copolymer matrix in the inert solvent. The monomer material may be any monomer capable of forming a rubbery polymer by polymerization. The monomer material may comprise an acrylate, a diolefin, or a mixture of acrylate and diolefin.

Suitable acrylates comprise alkyl esters of acrylic acid and/or methacrylic acid. Alkyl esters, wherein the alkyl group is a saturated straight or branched chain containing from 1 to about 14 carbon atoms, in particular from 2 to 12 carbon atoms, are preferably used. Specific examples of such alkyl radicals are ethyl, n-propyl, isopropyl, n-butyl, sec-butyl isobutyl, hexyl, heptyl, 2-octyl, 2-ethylhexyl, nonyl, decyl, dodecyl and tetradecyl radicals.

Within the process of the invention, an acrylic acid ester alone or a mixture of esters of acrylic acid may be used, or else a mixture of an aliphatic alkyl ester of methacrylic acid, wherein the alkyl is straight or branched and contains from 1, or preferably 2, to about 18, in particular from 1 or 2 to about 16, carbon atoms with at least one ester of acrylic acid, may also be used. A typical example of a methacrylic acid ester is butyl, methacrylate.

In addition to the esters of acrylic acid, a monomer mixture may include an amount of other copolymerizable monomers which does not cause any detrimental effect on the properties of the rubber. Such copolymerizable monomers include styrene, acrylonitrile, and methacrylonitrile. The selection of the alkyl radical and the respective amounts of esters of acrylic acid and methacrylic acid are such that the resulting polymer or copolymer exhibits rubbery properties, that is, e.g. a glass-transition temperature $T_G$ lower than about 0° C.

Useful diolefins include conjugated diolefins such as butadiene, isoprene, chloroprene; alkenyl acrylates such as allyl acrylate and allyl methacrylate; and diacrylate or dimethacrylate esters of diols such as ethylene glycol diacrylate or dimethacrylate and butanediol diacrylate or dimethacrylate. Butadiene is especially preferred.

If the monomer material does not contain any conjugated diolefin, cross-linking agents should be added to the solution of styrenic polymer matrix. These agents lead to cross-linking of the acrylic rubber formed in situ and they improve therefore the impact strength of the final resin. Typically, such cross-linking agents are polyfunctional compounds. Specific examples of such agents include alkyenyl esters of lower aliphatic acids, such as vinyl methacrylate, divinyl adipate, diallyl fumarate, diallyl maleate, allyl acrylate, diallyl phthalate, triallyl cyanurate; or polyacrylates or polymethacrylates of polyol compounds, such as ethylene glycol dimethacrylate, 1,3-butyleneglycol dimethacrylate, triethyleneglycol dimethyacrylate, diethylene glycol diacrylate or dimethacrylate, glyceryl triacrylate, pentamethyleneglycol diacrylate and the like. The amount of cross-linking agent used may be as low as about 0.025 weight % and may reach about 5 weight %, based on the amount of the acrylic rubbery polymer.

According to a particularly preferred embodiment, the monomer material comprises a mixture of at least one ester of acrylic acid and optionally methacrylic acid and a monomer containing two double bonds, e.g., a conjugated diolefin such as isoprene and/or butadiene. The acrylate ester monomer and the cross-linking agents, if any, are added to the styrenic polymer matrix solution in a mixing vessel provided with a stirrer. The amount of monomer material may vary between about 15 and 50 weight percent, based on the total weight of polymeric matrix and monomer material. The residence time and the temperature must be sufficient to assure a dissolution or at least a homogeneous dispersion of the monomer material into the matrix solution, but must not exceed values at which polymerization of the monomer material could occur. A premature and unwanted polymerization of the monomer material would result in the formation of gels. The temperature in this vessel in generally lies between about 70° C. and 130° C. and more generally between about 80° and 120° C. The residence time depends on this temperature and on other factors, such as the type of monomer material and the concentration of the solution of styrenic polymer matrix; it can readily be selected by a worker skilled in the art.

The resulting solution is introduced into a polymerization zone for mass polymerization of the monomer material and formation in situ of rubbery particles. The solution may also contain other conventional components including stabilizers, chain transfer agents, molecular weight regulators and internal lubricants, such as mineral oils. The polymerization of the monomers capable of forming rubbery copolymer in the presence of the styrenic polymer matrix may be performed in accordance with the usual mass polymerization processes, that is to say, in bulk or solution at temperatures generally ranging from about 100° C. to about 170° C.

According to one embodiment of this invention, the mass polymerization may be a thermal polymerization. The temperature in this polymerization zone is maintained at a value varying between about 120° C. and 170° C. and which is sufficiently high to convert the acrylate ester monomers to a rubbery polymer.

According to another embodiment of the invention, the mass polymerization is performed in the substantial absence of molecular oxygen and in the presence of a free radical generating catalyst. Preferred catalysts include peroxides, hydroperoxides, peresters or perazocompounds, such as di-tert-butylperoxide, lauroyl peroxide, cumyl peroxide or hydroperoxide, azo-bis-isobutyronitrile or mixtures thereof. The amount of such catalysts may vary between about 0.02 and about 2.5 wt. %, preferably between about 0.05 and about 1.5 wt. %, based on the total weight of the monomers and the copolymer. This polymerization is carried out at a temperature between about 100° and about 140° C.

In each of these embodiments, the choice of the temperature depends mainly on the type of monomer material and on the composition of the solution introduced into the polymerization zone. Generally, high temperatures lead to the formation of rubber particles having undesirably small sizes and the final rubber reinforced styrenic resins have a low impact strength. The reactors are therefore provided with suitable means, such as cooling jackets, for close control of the temperature.

According to a preferred embodiment of the present invention, the polymerization zone contains two successive polymerization reactors with the use of a mixture of two catalysts. One free radical generating catalyst has a short half-life, while the second catalyst has a longer half-life. By way of example, the catalyst system may comprise a mixture of a perester (such as tert-butyl perbenzoate or tert-butyl peracetate), and a peroxide or hydroperoxide (such as tert-butyl peroxide, dicumylperoxide or cumylhydroperoxide). In the first reactor, polymerization is started at a temperature of about 100° to about 120° C. under the action of the perester catalyst, converting about 75 to 85% by weight of the monomer material. Complete conversion of the monomers is then carried out in the second reactor, at a temperature of about 120° to about 140° C., under the action of the peroxide catalyst.

A suitable way to perform the polymerization consists in using a first tank reactor, provided with a stirrer and with means for close control of the temperature. The prepolymer withdrawn from this first reactor is then introduced into a staged isobaric stirred reactor. Such a reactor is a cylindrical, elongated, horizontal vessel provided with a longitudinal shaft and with baffles for partition into stages, each stage having an agitator associated with the shaft. Each baffle is provided with a top aperture for passage of evaporated vapor which is removed, condensed and recycled, for example, to the first reactor. Each baffle is also provided with a bottom aperture for passage of the polymerizing mixture. Control means are adapted to regulate pressure, temperature and flow of said mixture in each stage. The prepolymer is thereby further polymerized by a progressive multistage polymerization, under a substantially linear flow and under isobaric conditions.

During this polymerization step, the monomer material is polymerized with formation in situ of a rubbery material. If necessary, cross-linking agents may be used to assure good cross-linking of this rubbery material.

The resulting rubber reinforced styrenic resin is withdrawn from the polymerization zone and is then subjected to a treatment, such as vacuum treatment in a devolatilizer or heat treatment in a film-type evaporator, in order to remove the solvent and any residual monomer. The resin is thereafter extruded, generally in the presence of an antioxidant and optionally in the presence of a conventional plasticizing agent, and diced to form pellets.

In the resulting rubber reinforced resins, the rubbery polymer formed in situ is highly dispersed in the continuous styrenic resin phase, and the final resin is practically gel-free.

In the prior processes for producing rubber reinforced styrenic resins, styrene or a mixture of styrenic compound and acrylonitrile was polymerized in the presence of a rubber. This latter is particularly effective when it is present during the polymerization of the monomers (styrene or styrene and acrylonitrile). Grafting of some monomer to rubber takes place and occlusion of polystyrene or styrene-acrylonitrile copolymer extends the volume fraction of the dispersed, reinforcing rubber phase. This rubber contains double bonds which provide grafting sites and a high percentage of styrenic polymer chains are chemically grafted onto the rubbery polymer chains. In contrast thereto, with the process of the present invention a copolymeric matrix is first produced and thereafter the monomer material is added to the matrix and then polymerized to form a rubbery polymer which is only partly grafted onto the matrix. However, it has been unexpectedly found that the resulting rubber reinforced styrenic resin has enhanced properties. The exact reasons for the unexpectedly superior properties of resins produced according to the present invention are not known for certain, but it is believed that superior results are achieved because:

(a) the monomer material is uniformly dispersed in the copolymeric matrix and (b) polymerization of this monomer material is confined to the matrix, without production of separate particles of rubbery polymer and thus, without gel formation.

The final rubber reinforced styrenic resin is characterized by a high degree of homogeneity of the rubber particles throughout the copolymeric matrix.

Further details of the invention will become apparent from a consideration of the following illustrative examples.

EXAMPLE 1

A monomer mixture comprising 40% acrylonitrile and 60% styrene is continuously fed to a vertical continuously stirred reactor. The reaction is operated at a controlled polymerization temperature of 125° C. The residence time in the reaction is controlled by adjusting the operating level to maintain a percent conversion of the monomers up to 50%. Ethylbenzene is added to the reactor as a diluent in levels up to 20%. The above monomer compositions refer only to the ratio of monomers irrespective of the ethylbenzene content. Due to the copolymerization kinetics, the composition of the copolymer matrix is approximately 30% acrylonitrile and 70% styrene.

This polymer solution is then introduced continuously into a second continuously stirred reactor, which is also circulated by means of a high volume gear pump. Immediately upstream of this pump additional monomers which form rubbery polymers are continuously added. Butylacrylate and butadiene monomer are added in concentrations relative to the feed polymer solution of 5.2% and 20.6% respectively. The gear pump facilitates the dissolution and dispersion of the monomers in the polymer solution. Copolymerization of the reactive monomers is then carried out under controlled conditions continuously in the second continuously stirred reactor. As polymerization continues, a polymer of Styrene-Acrylonitrile-Butadiene-Acrylate (ABSA) is formed of which the rubbery components are acrylate and butadiene. The percent conversion of the reacting monomers is controlled at approximately 85% conversion. Thus, the polymer phase will contain approximately 30% rubbery polymers. This polymer solution is then introduced into a vacuum devolatilization apparatus in which the unreacted butadiene and a portion of the unreacted butyl acrylate, styrene, acrylonitrile and ethylbenzene diluent are removed and condensed. The polymer solution from this devolatilization will then be preheated to approximately 230° C. in a shell and tube heat exchanger and then again devolatilized under vacuum. All the remaining unreacted monomers will then be removed and condensed. The final polymer melt will then be pumped through a die via a gear pump and diced to produce pellets of polymer.

EXAMPLE 2

A mixture of 30% butadiene and 70% styrene based on monomers is continuously added to a vertical continuously stirred reactor. In addition ethylbenzene diluent may be added to the reactor in concentrations of up to 20%. Approximately 0.1% tert-butyl perbenzoate initiator is also added in solution with the styrene. The polymerization is carried out under controlled conditions at 230° F. with residence time maintained to convert approximately 60% of the reactive monomers to polymer.

The resulting polymer solution is then introduced continuously to a second continuously stirred reactor to which an additional amount of styrene monomer is added to reduce the % polymers to 15% exclusive of ethylbenzene. The monomers continue to react under controlled conditions at 125° C. to a percent conversion of approximately 40-50%. During the polymerization, the rubbery polymer phase passes through the inversion stage and is highly dispersed in the continuous polystyrene phase. The agitated reactor facilitates the formation and dispersion of the rubber particles.

This polymer solution is then introduced into two plug flow reactors operated in series in which the unreacted styrene monomers are polymerized under controlled conditions of 145° C. and 155° C. respectively. The residence time is controlled to give a final percent conversion of reactive monomers of 80%.

This polymer solution is then preheated to approximately 230° C., devolatilized under vacuum, extruded, and diced. The stripped unreacted monomers and ethylbenzene are condensed and recovered.

EXAMPLE 3

A monomer mixture containing 40% acrylonitrile and 60% styrene, is continuously fed to a vertical continuously stirred reactor. The reactor is operated at a controlled polymerization temperature of 125° C. The residence time in the reactor is also controlled by adjusting the operating level to maintain a percent conversion of the monomers at 60%. Ethylbenzene is also added to the reactor as a diluent at levels of up to 20%. The foregoing monomer compositions refer only to the ratio of monomers irrespective of the ethylbenzene content. Due to the copolymerization kinetics, the composition of the polymer phase will be approximately 30% acrylonitrile and 70% styrene.

This polymer solution is then continually fed to a vacuum chamber where some of the unreacted acrylonitrile, styrene, and ethylbenzene diluent are removed and condensed. The remaining polymer solution is preheated to 230° C. and again devolatilized under vacuum to remove the remainder of the unpolymerized styrene and acrylonitrile.

The devolatilized polymer melt is pumped through a heat exchanger to reduce the temperature of the melt to 150° C. This temperature controlled melt is then introduced under a pressure of about 1000 psig into an agitated reactor. As the Styrene-acrylonitrile polymer melt is continuously added to the reactor, additional butyl acrylate and butadiene monomers are injected continuously at concentrations of 8.6% and 34.3% respectively related to the polymer melt. As this compositon proceeds through the reactor, the monomers are absorbed and dispersed in the styrene-acrylonitrile phase. The rubber-modified polymer melt is then introduced into an extruder where it passes through a vacuum vent zone for removal of any residual unreacted monomers and is then extruded and diced.

EXAMPLE 4

A mixture of 73 parts styrene and 27 parts acrylonitrile is continuously fed to a stirred polymerization reactor. 50 parts of ethylbenzene are also added as a diluent along with 0.5 parts tert-butyl perbenzoate catalyst. The reaction mixture is heated to 110° C., and the monomers are polymerized by continuous mass polymerization until the initial continuous monomer phase is inverted to form a continuous styrene-acrylonitrile copolymer matrix with residual monomer dispersed throughout the matrix.

The reactor is continuously cooled to prevent the temperature from exceeding 140° C. and control the rate of reaction. The resulting prepolymer solution is continuously withdrawn from the reactor, and 20 parts butadiene are admixed with the prepolymer solution. The admixture is pumped continuously via a gear pump into a staged isobaric stirred reactor where it is subjected to mass polymerization. 0.3 parts of dicumyl peroxide catalyst are injected into the reaction mixture. The reactor is continuously cooled to maintain the temperature at less than 140° C. An acrylonitrile-butadiene-styrene copolymer solution is continuously withdrawn from the second reactor.

The polymer solution is spread to form a film and subjected to a heat treatment to remove the ethylbenzene and residual monomer materials after which it is extruded and diced to form a butadiene rubber reinforced styrene-acrylonitrile copolymer.

EXAMPLE 5

Into a stirring vessel are charged 120 parts ethylbenzene, 100 parts of acrylonitrile-butadiene-styrene resin comprising 68.6% styrene, 25.4% acrylonitrile and 6% polybutadiene, 35 parts butyl acrylate monomer and 3 parts ethyleneglycol dimethacrylate. The resulting polymer solution is continuously introduced into a continuous mass polymerization reactor along with 0.5 parts tert-butyl peroxide and polymerized. The reaction zone is continuously cooled to a temperature between 120° and 140° C. to control the rate of polymerization. The resulting polymer solution is continuously withdrawn from the reactor and conveyed to a devolatilization chamber where it is subjected to a vacuum treatment to remove the solvent and any unreacted monomers. The acrylate rubber reinforced ABS resin is recovered, extruded and diced to form pellets for shipment or storage.

EXAMPLE 6

A solution comprising 100 parts polystyrene, 150 parts xylene and 30 parts ethylhexyl acrylate is continuously charged along with 0.8 part tert-butyl perbenzoate catalyst into a stirred polymerization reactor and reacted by continuous mass polymerization to produce a prepolymer solution. The reactor is continuously cooled during the reaction to prevent the temperature from exceeding 125° C. The prepolymer solution is continuously withdrawn from the first reactor and introduced into a staged isobaric stirred reactor along with 13 parts 1,3-butadiene and 1.5 parts dicumyl peroxide where it is polymerized by continuous mass techniques to produce a cross-linked acrylate rubber reinforced polystyrene. During the second stage of the reaction, the temperature is allowed to rise to 135° C.

The final mixture is continuously withdrawn from the second stage reactor to a devolatilization zone where it is subjected to a vacuum treatment to remove the xylene and residual monomers therefrom. The resulting polymer is extruded and diced to form pellets.

EXAMPLE 7

A solution of 60 parts ethylbenzene and a styrenic copolymer produced by polymerizing 57 parts styrene with 43 parts methyl methacrylate is admixed with 40 parts butyl acrylate and 0.7 part allyl methacrylate cross-linking agent and continuously introduced along with 0.5 part tert-butyl peracetate and 0.3 part lauroyl peroxide into a staged isobaric stirred polymerization reactor wherein it is polymerized by continuous mass to produce an acrylate rubber reinforced styrene-methyl methacrylate copolymer. The polymer containing reaction mixture is continuously withdrawn from the reaction zone, devolatilized to remove ethylbenzene and residual monomer material and then extruded and diced to produce rubber reinforced styrenic polymer pellets.

In the foregoing examples, all parts are given by weight. The rubber reinforced styrenic polymers produced according to the foregoing examples are substantially gel-free and all exhibit significantly improved impact strengths compared with styrenic compound homopolymers or simple copolymers of styrenic compounds and acrylonitriles.

The foregoing embodiments have been set forth merely as examples of the invention and are not intended to be limiting. Since modifications of the disclosed embodiments incorporating the spirit and substance of the invention may occur to persons skilled in the art, the scope of the invention is to be limited solely by the scope of the appended claims.

We claim:

1. A process for continuous preparation of a rubbery polymer material reinforced styrenic resin comprising the steps of:
   a. adding a monomer material selected from the group consisting of alkyl esters of acrylic acid, alkyl esters of methacrylic acid and mixtures thereof, together with a polyfunctional cross-linking agent to a first solution of a copolymeric matrix of a styrenic compound and an acrylonitrile compound in an inert solvent, whereby there is formed a second solution of monomer material, polyfunctional cross-linking agent and said copolymeric matrix in said inert solvent;
   b. continuously charging said second solution into a polymerization zone and subjecting said second solution in said polymerization zone to mass polymerization conditions to polymerize said monomer material whereby there is formed in situ a cross-linked rubbery material dispersed in said copolymeric matrix;
   c. continuously withdrawing the reaction mixture from said polymerization zone and continuously charging the withdrawn mixture into a devolatilization zone to remove the inert solvent and any residual monomer material, and
   d. recovering a rubbery polymer material reinforced styrenic resin wherein the rubbery material formed in situ is highly dispersed in the copolymer matrix.

2. A process according to claim 1, wherein the styrenic polymer matrix comprises a copolymer of from about 10 to about 90 weight percent styrenic compound and about 90 to about 10 weight percent acrylonitrile.

3. A process according to claim 2, wherein the weight ratio of styrenic compound to acrylonitrile comprises between about 4:1 and about 1:1.

4. A process according to claim 2, wherein the copolymeric matrix comprises a minor amount of a rubbery polymer not exceeding about 8% by weight.

5. A process according to claim 1, wherein the solution of copolymeric matrix in the inert solvent comprises from about 10 to about 70 weight % of copolymeric matrix.

6. A process according to claim 5, wherein the solution contains from about 20 to about 50 weight % of copolymeric matrix.

7. A process according to claim 1, wherein the monomer material is a saturated alkyl ester wherein the alkyl group contains from 1 to 14 carbon atoms.

8. A process according to claim 7, wherein the monomer material produces a rubbery material having a glass-transition temperature lower than about 0° C.

9. A process according to claim 7, wherein the amount of monomer material comprises between about 15 and 50%, based on the total weight of the copolymeric matrix and monomer material.

10. A process according to claim 1, wherein the cross-linking agent is selected from the group consisting of alkenyl esters of lower aliphatic carboxylic acids, acrylates of polyol compounds, methacrylates of polyol compounds and mixtures thereof.

11. A process according to claim 10, wherein the amount of cross-linking agent comprises between about 0.025% and about 5%, based on the weight of the monomer material.

12. A process according to claim 1, wherein the inert solvent is a saturated solvent having a boiling point between about 120° and about 175° C.

13. A process according to claim 12, wherein the saturated solvent has a boiling point between about 130° and about 150° C.

14. A process according to claim 12, wherein the solvent is an alkylbenzene.

15. A process according to claim 14, wherein the solvent is ethylbenzene.

16. A process according to claim 1, wherein the mass polymerization is a thermal polymerization and is carried out at a temperature between about 130° and about 170° C.

17. A process according to claim 1, wherein the mass polymerization is carried out in the presence of a free radical generating catalyst at a temperature between about 120° and about 140° C.

18. A continuous mass polymerization process for preparing rubbery polymer reinforced styrenic copolymer resins comprising the steps of:
   a. forming a solution in an inert solvent comprising a styrenic polymer matrix and a monomer material capable of polymerizing to form a cross-linked rubbery polymer material;
   b. continuously charging said solution from step a. into a polymerization reactor and subjecting said solution to mass polymerization conditions to mass polymerize said monomer material whereby there is formed in situ a cross-linked rubbery polymer material dispersed in the styrenic polymer matrix;
   c. continuously withdrawing the reaction mixture from step b. from said polymerization reactor; and
   d. recovering a rubbery polymer reinforced styrenic copolymer resin from the withdrawn reaction mixture from step c.

19. A process according to claim 18 wherein said styrenic polymer matrix is selected from the group consisting of styrene homopolymers, copolymers of styrene and acrylonitrile; copolymers of styrene, acrylonitrile and butadiene; copolymers of styrene and butadiene; and copolymers of styrene and methyl methacrylate.

20. A process according to claim 18 wherein said styrenic polymer matrix is a copolymer of styrene and at least one other ethylenically unsaturated monomer.

21. A process according to claim 20 wherein said copolymer is a styrene-acrylonitrile copolymer.

22. A process according to claim 18 wherein said monomer material comprises at least one monomer selected from the group consisting of acrylate monomers and conjugated diolefins.

23. A process according to claim 22 wherein said monomer material comprises an alkyl ester of acrylic acid or methacrylic acid and an effective polyfunctional cross-linking amount of at least one cross-linking agent.

24. A process according to claim 23 wherein said alkyl ester is selected from the group consisting of n-butyl acrylate and 2-ethylhexyl acrylate.

25. A process according to claim 22 wherein said monomer material comprises a conjugated diolefin.

26. A process according to claim 25 wherein said conjugated diolefin is 1,3-butadiene.

27. A process according to claim 18 wherein said recovery step comprises treating the mixture withdrawn from the polymerization reactor to remove the inert solvent and any residual monomer material which may be present therein.

28. A process according to claim 27 wherein said mixture is devolatilized in a vacuum chamber to remove the inert solvent and any residual monomer material.

29. A process according to claim 27 wherein a film of said mixture is heated to remove the inert solvent and any residual monomer material.

30. A process according to claim 18 wherein said inert solvent is a saturated alkylaromatic compound.

31. A process according to claim 30 wherein said saturated alkylaromatic compound is ethylbenzene.

32. A process according to claim 18 wherein the initial solution is formed by mass polymerization of a mixture of styrene and acrylonitrile in an inert solvent to produce a styrene-acrylonitrile copolymer matrix in solution in said solvent, said matrix being substantially free of reactive sites; and thereafter adding said monomer material to the copolymer matrix solution.

33. A process according to claim 18 wherein said mass polymerization is effected at a temperature lying in the range from about 100° C. to about 170° C.

34. A process according to claim 18 wherein said mass polymerization is effected in the substantial absence of molecular oxygen and in the presence of at least one free radical generating catalyst.

35. A process according to claim 34 wherein said mass polymerization is effected at a temperature lying in the range between about 100° C. and about 140° C.

36. A process according to claim 18 wherein said mass polymerization is a thermal polymerization.

37. A process according to claim 36 wherein said mass polymerization is effected at a temperature lying in the range from about 120° C. to about 170° C.

38. A process according to claim 18 wherein said rubbery polymer reinforced styrenic copolymer resin is substantially gel-free.

39. A process according to claim 18 wherein said monomer material is selected from the group consisting of acrylic acid esters, mixtures of acrylic acid esters, and mixtures of a methacrylic acid ester with at least one acrylic acid ester.

40. A process according to claim 39 wherein said monomer material further comprises an effective cross-linking amount of at least one polyfunctional cross-linking agent.

41. A process according to claim 18 wherein said styrenic polymer matrix is substantially free of reactive sites.

42. A process according to claim 18 wherein said monomer material is substantially uniformly dispersed throughout said styrenic polymer matrix in said solution.

43. A continuous mass process for preparing rubbery polymer reinforced ASA styrenic resins comprising the steps of:

a. forming a solution in an inert solvent of a styrene-acrylonitrile copolymer matrix together with an acrylate monomer and a polyfunctional cross-linking agent;
b. continuously charging said solution into a polymerization zone and subjecting it to mass polymerization whereby there is formed in situ a cross-linked rubbery material dispersed in the styrene-acrylonitrile matrix,
c. continuously withdrawing the reaction mixture from the polymerization zone and charging it into a devolatilization zone; and
d. recovering the resulting rubbery polymer reinforced ASA styrenic resin.

* * * * *